United States Patent
Fan et al.

(10) Patent No.: US 8,989,698 B2
(45) Date of Patent: Mar. 24, 2015

(54) SUPPLEMENTAL RESCUE RESOURCES

(71) Applicant: AT&T Intellectual Property I, LP, Atlanta, GA (US)

(72) Inventors: James W. Fan, San Ramon, CA (US); Jeffrey A. Aaron, Atlanta, GA (US); Jennifer K. Lam, Fremont, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/693,227

(22) Filed: Dec. 4, 2012

(65) Prior Publication Data

US 2014/0155017 A1 Jun. 5, 2014

(51) Int. Cl.
 *H04M 11/04* (2006.01)
 *H04W 4/22* (2009.01)
 *H04W 4/02* (2009.01)

(52) U.S. Cl.
 CPC . *H04W 4/22* (2013.01); *H04W 4/02* (2013.01)
 USPC ............ 455/404.1; 455/404.2; 455/403; 455/410; 455/550.1; 702/186; 702/181; 379/37

(58) Field of Classification Search
 CPC ....................................... H04M 11/04
 USPC ............................ 455/404.1, 404.2
 See application file for complete search history.

(56) References Cited

U.S. PATENT DOCUMENTS

2011/0046920 A1* 2/2011 Amis .......................... 702/181
2011/0151829 A1* 6/2011 Velusamy et al. ......... 455/404.2

* cited by examiner

*Primary Examiner* — Charles Appiah
*Assistant Examiner* — Randy Peaches
(74) *Attorney, Agent, or Firm* — Baker & Hostetler LLP

(57) ABSTRACT

A supplemental rescue resources system can receive an emergency alert message from a mobile device and use data from the message and other sources to determine and select appropriate supplemental rescue resources, which may include may include any person that has volunteered or is otherwise a participant in the system that is not an on-duty emergency responder. The supplemental rescue resources system may select a supplemental rescue resources based on the location of such resources relative to the location of an incident, and/or the qualifications and/or preferences of such resources. The supplemental rescue resources system may direct resources to the incident and notify emergency services providers of the supplemental resources. The supplemental rescue resources system may request and/or receive additional information from supplemental resources, emergency services providers, and/or those reporting incidents and use this information to adjust the notified supplemental resources, update emergency services providers, and/or update affected parties.

20 Claims, 8 Drawing Sheets

SUPPLEMENTAL RESCUE RESOURCES

TECHNICAL FIELD

The technical field generally relates to wireless communications and specifically relates to use of supplemental emergency response resources in a wireless communications system.

BACKGROUND

Current wireless communications technologies have been a great benefit to those who find themselves in an emergency situation. For example, where once someone in an emergency situation had to get to a landline telephone to alert authorities or others about the emergency, wireless mobile telephones offer users a quick and easy way to contact emergency response agencies (police, fire department, ambulance, etc.) or anyone else when and where the user encounter an emergency. Emergency response personnel are typically contacted through a voice call to an emergency number, such as "911" in the United States. More recently, alternative communications may be used to contact emergency personnel, such as email and text messages, and some devices are now equipped to automatically generate and send emergency communications at the press of a button or detection of some other input or condition. However, current wireless mobile devices and their associated networks merely provide a communications means to communications from one in need of assistance to a centralized emergency services provider who then locates and transmits instructions or a notification of an emergency to emergency services personnel. In the current state of the art, wireless communications networks and devices are not actively involved in locating and notifying those that, while capable of providing assistance, are not currently actively working for an emergency services provider.

SUMMARY

A supplemental rescue resources system may receive an emergency alert message from a mobile device and use data from the message and other sources to determine and select appropriate supplemental rescue resources. Supplemental rescue resources may include any person that has volunteered or is otherwise a participant in the system that is not an on-duty emergency responder. The supplemental rescue resources system may select a supplemental rescue resources based on the location of such resources relative to the location of an incident, and/or the qualifications and/or preferences of such resources. The supplemental rescue resources system may direct resources to the incident and notify emergency services providers of the supplemental resources. The supplemental rescue resources system may request and/or receive additional information from supplemental resources, emergency services providers, and/or those reporting incidents and use this information to adjust the notified supplemental resources, update emergency services providers, and/or update affected parties. A response message may be sent to the mobile device that requested assistance, notifying it that help is on the way and providing other information. These and other aspects of the present disclosure are set forth in more detail below and in the figures.

BRIEF DESCRIPTION OF THE DRAWINGS

The following detailed description of preferred embodiments is better understood when read in conjunction with the appended drawings. For the purposes of illustration, there is shown in the drawings exemplary embodiments; however, the subject matter is not limited to the specific elements and instrumentalities disclosed. In the drawings.

DETAILED DESCRIPTION OF ILLUSTRATIVE EMBODIMENTS

In an embodiment, certain people who are qualified to assist those in an emergency, or simply interested in assisting those in an emergency, may be enrolled or otherwise associated with a supplemental rescue resources system. These people may be people who are not emergency services personnel or who are emergency services personnel but who are not working or on-duty at the time an emergency occurs. In an embodiment, a supplemental rescue resources system may determine whether any such people are available to assist in an emergency based on some criteria. For example, a supplemental rescue resource system may determine that someone listed as a participant in the supplemental rescue resources system is close to someone else who has reported a heart attack, and that the supplemental rescue resources system member is trained in CPR. Upon this determination, the supplemental rescue resources system may automatically notify the member and request that they assist. A supplemental rescue resources system may be implemented as set forth below, where additional non-limiting examples and embodiments are disclosed.

Figure 1:
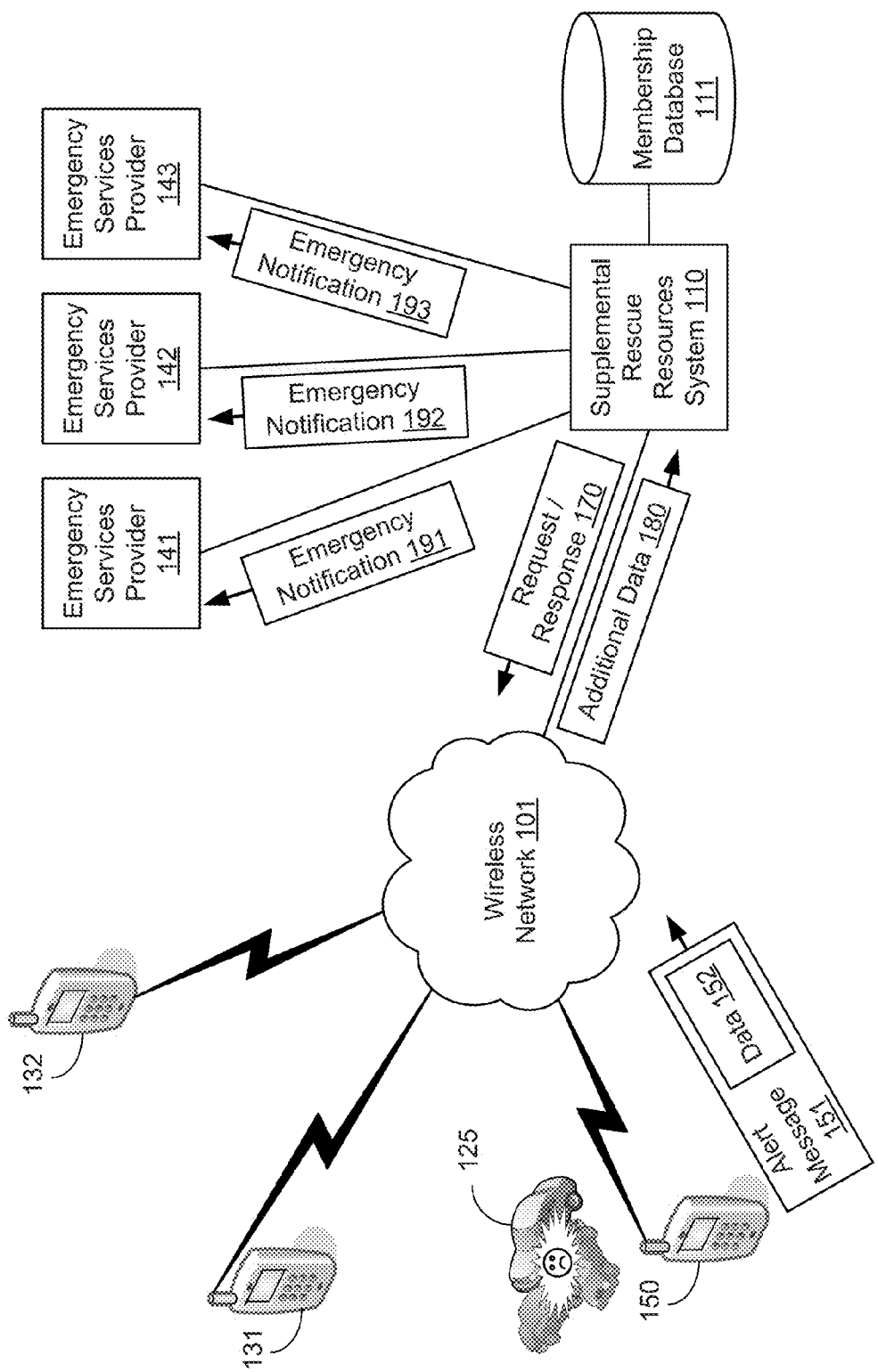
FIG. 1 illustrates a non-limiting exemplary system in which supplemental rescue resources methods and systems may be implemented.

FIG. 1 illustrates an exemplary system that may be used to implement supplemental rescue resources methods and systems. Mobile device 150, in an embodiment operated by a customer of a provider of network 101, may be in communication with network 101 using any wireless communications technology. Mobile device 150 may be any type of wireless communications device, including user equipment (UE), a wireless transmit and receive unit (WTRU) a mobile telephone, a wireless communications device, a smartphone, or any other communications device as disclosed herein, or any other type of device capable of being configured to perform the functions and features of the present disclosure. Mobile devices 131 and 132 may also be any type of wireless communications device and may be configured to communicate with network 101. Network 101 may be any type and any number of communications networks, including a wireless network, a wired network, and a combination thereof, implementing any number and type of communications protocols and technologies. All such embodiments are contemplated as within the scope of the present disclosure.

An operator of mobile device 150 may be involved in, proximate to, or simply aware of incident 125. Incident 125 may be any incident or occurrence that may require emergency services or some sort of emergency response (e.g., car accident, fire, health emergency, criminal activity, etc.)

In response to becoming aware of incident 125, an operator of mobile device 150 may operate mobile device 150 to transmit alert message 151 to network 101. This may be accomplished using any means, including user activation of a control on mobile device 150 that generates and transmits alert message 151, user dialing of an emergency telephone number on mobile device 150 (e.g., "911"), and user initiation of a text message or other message. In another embodiment, mobile device 150 may automatically generate alert message 151 in response to the detection of certain conditions that may be caused by or represented by incident 125. For example, mobile device 150 may be equipped with heat, audio, wave, and/or motion sensors that detect major environmental changes and, in response to activation of one or more such sensors, mobile device 150 may automatically generate and transmit alert message 151. In another example, mobile device 150 may be equipped with health-related measurement and/or detection hardware and/or software to detect a user of mobile device's 150 health condition changes. In another alternative, mobile device 150 may interface with other devices, for example using a short range wireless protocol (e.g., Bluetooth), such as implanted health devices and/or sensors, local surveillance cameras and/or software, local transportation vehicles (e.g., car, motorcycle, etc.), other user devices, etc.

In yet another embodiment, mobile device 150 may initiate and/or execute an application (e.g., mobile device "app"), which may be preinstalled on mobile device 150 or downloaded onto mobile device 150 before or after purchase of the device, and which may be updateable at any point in time, that generates and/or transmits alert message 151. Such an application may generate alert message 151 and directly transmit the message, or it may generate alert message 151 and cause mobile device 150 to transmit the message. Such an application may generate and/or transmit alert message 151 automatically without user intervention or at the request of a user, for example by activation of a control of the application. All such embodiments are contemplated as within the scope of the present disclosure.

Alert message 151 may be any type and form of alert message, request for assistance, rescue request, or any other message indicating that assistance from at least one emergency services provider may be needed that may be transmitted from a mobile device to a network. Alert message 151 may include data 152 that represents any type of data and any combination of types of data that may be included in an emergency alert message. For example, data 152 may include video, text, voice data, one or more images, audio data, computer instructions, location data, or any other type of data or any combination thereof. Alert message 151 and/or data 152 may include information identifying mobile device 150, an operator or account associated with mobile device 150, and/or any other identifier, address, location, type, model, capability, and/or any other characteristic or identifier that may be associated with a mobile device, an account associated with a mobile device, or a user of a mobile device.

Note also that alert message 151 represents one or more messages, packets, or other communications. For example, alert message 151 may represent several voice data packets transmitted from mobile device 150. In an embodiment, alert message 151 may represent several periodic alert messages. For example, a user of mobile device 150 may first place an emergency call (e.g., call to "911") and then capture and transmit images of incident 125 at later time via text message or email. All such communications are represented by alert message 151.

Data 152 may be data that was automatically collected and/or generated by mobile device 150, or data that was collected and/or generated by a user of mobile device 150. For example, data 152 may include health data automatically collected by mobile device 150 that is transmitted automatically to network 101 upon detection of an adverse health condition of a user of mobile device 150. In another example, data 152 may be a picture or video of incident 125 taken by a user of mobile device 150. Any means of acquiring and/or generating such data is contemplated as within the scope of the present disclosure.

Alert message 151 may be addressed by the transmitting mobile device to supplemental rescue resources system 110. Alternatively, network 101 may determine that alert message 151 is an emergency message, and in response may relay or send a copy of alert message 151 to supplemental rescue resources system 110. Supplemental rescue resources system 110 may be any number and type of devices or combination of devices that collect and process any type of data relevant to providing emergency services. Supplemental rescue resources system 110 may also represent software executing on hardware that is either dedicated to performing emergency services functions or on hardware that may perform other functions as well. Supplemental rescue resources system 110 may be located within network 101, may be separate but communicatively connected to network 101, or may be distributed among several physically separate devices, each of which may or may not be within network 101. Any configuration and/or design of supplemental rescue resources system 110 are contemplated as within the scope of the present disclosure.

Supplemental rescue resources system 110 may include or be communicatively connected to membership database 111. Membership database 111 may be one or more databases, systems, components, devices, or any combination thereof that may contain any portion of membership data, and any other data, as set forth herein. Membership data may include any information about potential supplemental rescue resources. Any person may be included in a supplemental rescue resources system, but in some embodiments membership or eligibility for participation in such a system may be restricted to those who have certain qualifications or training. For instance, participants may be limited to emergency services personnel who are available when off-duty. Alternatively, participants may be limited to those with emergency response training or other applicable training, such as retired emergency response personnel, doctors, past or present members of the military, people with specific training (e.g., CPR training), etc. In another alternative, participation in a supplemental rescue resources system may be open to anyone, and their activities may be limited based on their skills and training. For instance, an average person, untrained in emergency response, may be permitted to participate in a supplemental rescue resources system so that they can provide additional information, send pictures, audio, and/or video from the site of an incident, comfort those affected, and perform other non-specialist tasks. Any criteria or qualifications, or lack thereof, for participation in a supplemental rescue resources system are contemplated as within the scope of the present disclosure.

Membership data stored in membership database 111 may include any information about a participant in a supplemental rescue resources system. For example, membership database 111 may include each participant's name, contact information (e.g., mobile device telephone number), qualifications, age and/or birthdate, next of kin, employment status (e.g., off-duty professional emergency responder, civilian volunteer, etc.). Membership data may also include more specific information regarding the types of emergencies for which a participant is willing or capable of assisting. For example, a participant may specify that he or she is able to assist in car accidents, but not fires. Exceptions may be included in membership data. For example, a participant who cannot swim may have an exception noted in his or her record that the participant cannot assist in water-based incidents. Alternatively, a participant who is physically disabled may have an exception noted in his or her record that the participant has physical limitations that would hinder assistance in some situations.

In some embodiments, supplemental rescue resources system 110 may receive alert message 151 and may transmit one or emergency notifications to one or more emergency services providers. Each of emergency services providers 141, 142, and 143 may be any emergency services providers, including police, ambulance services, fire departments, local, state, or federal governmental agencies, etc. Supplemental rescue resources system 110 may transmit one or more of emergency notifications 191, 192, and 193. Each of emergency notifications 191, 192, and 193 may be a particularized request specifically intended for the destination emergency services provider. Alternatively, supplemental rescue resources system 110 may transmit a same emergency request to two or more emergency services providers. Each of emergency notifications 191, 192, and 193 may include any information that may be required by or helpful to an emergency services provider.

Alternatively, alert message 151 may be provided to supplemental rescue resources system 110 after, or in conjunction with, the transmission of alert message 151 to one or more of emergency services providers 141, 142, and 143. Upon determining and alerting supplemental rescue resources as set forth herein, supplemental rescue resources system 110 may then alert one or more of emergency services providers 141, 142, and 143 by transmitting one or more of emergency notifications 191, 192, and 193. Supplemental rescue resources system may determine the appropriate emergency services provider and the content of any emergency request or information sent to one or more of emergency services providers 141, 142, and 143 based on analysis of alert message 151 and/or a determination of the type and severity of incident 125, as well as the selected supplemental rescue resources.

Supplemental rescue resources system 110 may receive alert message 151 and process the message to determine whether supplemental rescue resources are available. For example, supplemental rescue resources system 110 may use data 152 to determine the type of emergency represented by incident 125 and then determine, using membership database 111, whether there are supplemental rescue resources available that are proximate to incident 125 and qualified or willing to assist. To determine proximity, supplemental rescue resources system 110 may determine a location for each participant in membership database 111. In an embodiment, supplemental rescue resources system 110 may use GPS or other location data for each member's mobile device obtained from wireless network 101. In another embodiment, supplemental rescue resources system 110 may send a query to each mobile device associated with a participant requesting location information. In other means of determining whether a participant is proximate to incident 125 is contemplated as within the scope of the present disclosure.

In one example, supplemental rescue resources system 110 may obtain a telephone number for each of mobile devices 131 and 132 from membership database 111 and query wireless network 101 and/or each of mobile devices 131 and 132 to determine their locations. Supplemental rescue resources system 110 may compare the determined locations of mobile devices 131 and 132 to a location determined from alert message 151 and determine a proximity. For example, supplemental rescue resources system 110 may determine that mobile device 131 is near incident 125, while mobile device 132 is not.

Supplemental rescue resources system 110 may also determine qualifications and/or preferences for the operators of each of mobile devices 131 and 132 from membership database 111. Supplemental rescue resources system 110 may compare the determined qualifications and/or preferences of the operators of mobile devices 131 and 132 to an incident type or quality determined from alert message 151 and determine whether either of the operators of mobile devices 131 and 132 is qualified and/or willing to assist. For example, supplemental rescue resources system 110 may determine that the operator of mobile device 131 is qualified to assist with incident 125, while the operator of mobile device 132 is not. Note that the determination of qualifications and/or preferences and the determination of proximity may be performed in any order, or in conjunction, and one skilled in the art will recognize that there are various ways to optimize these determinations in order to implement the disclosed systems most efficiently, depending on actual implementation hardware, software, and other factors. All such embodiments are contemplated as within the scope of the present disclosure.

Once one or more supplemental rescue resources are determined, supplemental rescue resources system 110 may send request/response 170 to the determined supplemental rescue resource. For example, supplemental rescue resources system 110 may transmit request/response 170 to mobile device 131 upon determining that that device is proximate to incident 125, and that the operator of mobile device is qualified and/or willing to assist. Request/response 170 may include any relevant information that the operator of mobile device 131 may use to assist those involved in incident 125, including an address of or near the incident, a telephone number of someone affected by the incident, a description of the incident, whether and which other emergency responders have been notified, etc.

Upon notifying one or more supplemental rescue resources, supplemental rescue resources system 110 may transmit one or more of emergency notifications 191, 192, and 193 to the appropriate emergency services provider notifying the provider that supplemental rescue resources have been notified. Each of emergency notifications 191, 192, and 193 may include any information that may of use to an emergency services provider, such as the name, telephone number, qualifications, and/or preferences of one or more supplemental rescue resources.

Supplemental rescue resources system 110 may request additional information from one or more devices associated with a participant in a supplemental rescue resources system. For example, supplemental rescue resources system 110 may transmit request/response 170 to mobile device 131 upon after transmitting an initial request to mobile device 131 that the operator of mobile device 131 assist at incident 125. Request/response 170 may include a request for an image of incident 125, which may then be obtained by a user of mobile device 131 and transmitted from mobile device 131 as additional data 180. In an embodiment, additional data 180 may be automatically generated and provided by a mobile device. For example, supplemental rescue resources system 110 may transmit request/response 170 to mobile device 131 requesting location data for mobile device 131 in order to determine whether the operator of mobile device 131 has arrived at incident 125 or to determine an approximate time of arrival at incident 125 for the operator of mobile device 131. Mobile device 131 may, in response, automatically determine its own location data and provide that data as additional data 180. Alternatively, any additional sensor data, image data, audio data, etc., may be requested from a mobile device and the mobile device may provide this data automatically. This may performed transparently to a user of mobile device 131, or may be done with an approval or notification of a user of mobile device 131. In an embodiment, a mobile device may be configured with an application or apparatus that allows it to be remotely controlled by a supplemental rescue resources system. Any request for any type of data is represented by request/response 170, and any type of response data is represented by additional data 180. Note that additional data 180 may be transmitted by mobile device 131 at the initiation of the operator of mobile device 131 rather than in response to a request for such data from supplemental rescue resources system 110.

Supplemental rescue resources system may receive additional data 180 and take further steps based on the data. For example, upon arrival at incident 125, a participant operating mobile device 131 may send a text message to supplemental rescue resources system 110 indicating his or her arrival. This information may then be transmitted from supplemental rescue resources system 110 to one or more of emergency services providers 141, 142, and 143 in one or more of emergency notifications 191, 192, and 193. Alternatively, other information may be received from mobile device 131 that indicates a condition, amount of damage, number of injuries, or any characteristic of incident 125 as additional data 180. This information may be sent to one or more of emergency services providers 141, 142, and 143 in one or more of emergency notifications 191, 192, and 193 from supplemental rescue resources system 110. One or more of emergency services providers 141, 142, and 143 may then adjust their response based on this information. For example, incident 125 may be more severe than initially contemplated, and one of emergency services providers 141, 142, and 143 may in response send additional resources to the site.

In an embodiment, information, instructional material, or any other type of media or information may be provided to mobile device 131, for example as request/response 170, to assist with providing help at incident 125. For example, supplemental rescue resources system 110 may send helpful information, such as a CPR tutorial video, to mobile device 131. Alternatively, supplemental rescue resources system 110 may send notes or audio describing how to identify and/or handle dangerous chemicals that may be present at incident 125. Note that any instructional, assistance, or informational media (e.g., video, audio, text, images, etc.) may be stored at, obtained by, and/or generated by supplemental rescue resources system 110, and any such material may be provided to one or more supplemental rescue resources. All such embodiments are contemplated as within the scope of the present disclosure.

In an embodiment, the user of mobile device 131 may directly request assistance from other participants in supplemental rescue resources system 110 or from nonparticipants. For example, the user of mobile device 131 may know that the user of mobile device 132 has particular skills, or is simply known to the user of mobile device 131, and may contact the user of mobile device 132 directly using any means, including a phone call, email, text message social media website or portal, etc. Such contact may be logged or otherwise tracked by supplemental rescue resources system 110 for logging purposes. Alternatively, such contact may go through supplemental rescue resources system 110, for example as additional data 180, and supplemental rescue resources system 110 may then contact the user of mobile device 132, for example with request/response 170, in an embodiment after determining that the user of mobile device 132 is an authorized supplemental rescue resource. Alternatively, the user of mobile device 132 may not be a current member of supplemental rescue resources system 110, but may be added on the fly as the user of mobile device 131 requests assistance from the user of mobile device 132 directly or through supplemental rescue resources system 110. In an embodiment, mobile device 131 may be configured with an application (e.g., "app") that detects or enables contact with other participants in supplemental rescue resources system 110 and/or nonparticipants and sends data to supplemental rescue resources system 110 (e.g., as additional data 180) so that such contact can be tracked and/or authorized. All such embodiments are contemplated as within the scope of the present disclosure.

In an embodiment, where specialized assistance may be needed or desired, supplemental rescue resources that have related specialized knowledge but are not able to be physically present at incident 125 may be communicatively connected to mobile device 131 in order to provide assistance. For example, it may be determined by supplemental rescue resources system 110 that the user of mobile device 132 has knowledge of particular relevance to incident 125, for example, based on alert message 151 and/or additional data 180. In response, supplemental rescue resources system 110 may contact the user of mobile device 132 and enable, instruct, or otherwise facilitate communications between mobile device 132 and mobile device 131. Such communications may be direct, (e.g., supplemental rescue resources system 110 instructs mobile device 132 to call mobile device 131, with to without user intervention) or indirect (e.g., supplemental rescue resources system 110 communicates with both mobile device 132 and mobile device 131 and bridges or otherwise facilitates the communications between the devices, with to without user intervention.) All such embodiments are contemplated as within the scope of the present disclosure.

Supplemental rescue resources system 110 may also, or instead, provide a response to mobile device 150 as part of its supplemental rescue resources processing. For example, supplemental rescue resources system 110 may transmit request/response 170 to mobile device 150 upon receiving and processing alert message 151. Request/response 170 may include an acknowledgement that alert message 151 was received, and an indication that a participant in the supplemental rescue resources system is on the way to assist. Request/response 170 may also include additional information such as an estimated time of arrival of the participant, a name and/or telephone number of the participant, other emergency contact information such as a local authorities' telephone number, or any other information or data that may be sent in response to an alert message. Any type of response including any information is represented by request/response 170.

Figure 2:
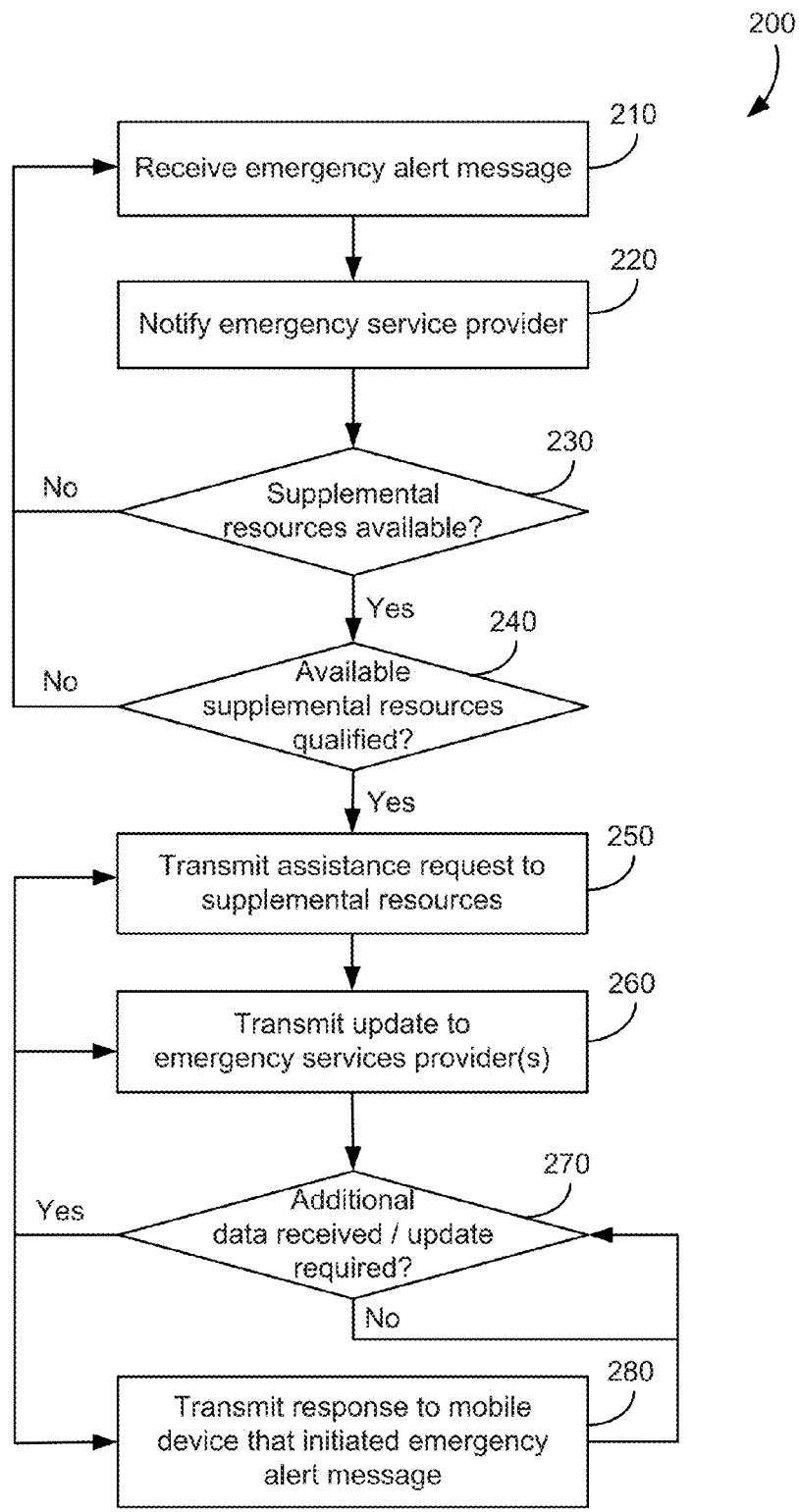
FIG. 2 illustrates a non-limiting exemplary method of implementing a supplemental rescue resources system.

FIG. 2 illustrates exemplary, non-limiting method 200 of implementing an embodiment as disclosed herein. Method 200, and the individual actions and functions described in method 200, may be performed by any one or more devices, including those described herein, such as the system illustrated in FIG. 1. In an embodiment, method 200 may be performed by a system such as supplemental rescue resources system 110, by any other network component or combination of components, or by any other device or component or combination thereof, in some embodiments in conjunction with other network elements, and/or software configured and/or executing on any network or network attached element. Note that any of the functions and/or actions described in regard to any of the blocks of method 200 may be performed in any order, in isolation, with a subset of other functions and/or actions described in regard to any of the other blocks of method 200 or any other method described herein, and in combination with other functions and/or actions, including those described herein and those not set forth herein. All such embodiments are contemplated as within the scope of the present disclosure.

At block 210, one or more emergency alert messages may be received at a supplemental rescue resources system. The one or more alert messages received at block 210 may be any message or messages, packets, or other communications directly or indirectly received from a mobile device. The emergency alert message may be any type and form of alert message, request for assistance, rescue request, or any other message indicating that assistance from at least one emergency services provider may be needed. The emergency alert message may include data of any type and any combination of types, including video, text, voice data, one or more images, audio data, computer instructions, location data, or any other type of data or any combination thereof.

At block 220, one or more emergency services providers may be notified. Note that this block may not be performed where the supplemental rescue resources system is copied or forwarded emergency alerts from users, but where the supplemental rescue resources system is the first system to receive an emergency alert, the supplemental rescue resources system may be configured to notify or otherwise pass on the emergency alert to the appropriate emergency services provider as soon as possible so that the emergency services provider can respond as quickly as possible.

At block 230, the emergency alert message may be analyzed using data included with the emergency alert message and/or data stored at and/or obtained by the supplemental rescue resources system. Data used to perform this analysis may be any data set forth herein and any other data that may be used to determine appropriate supplemental rescue resources. A determination may be made based on this analysis as to whether there are any members of the supplemental rescue resources system proximate to and/or available to assist with the reported incident. If there are not, in an embodiment, the supplemental rescue resources system resumes awaiting additional emergency alert messages.

At block 240, a determination may be made as to whether there are qualified supplemental rescue resources available. Thus, a supplemental rescue resources system may determine, based on an analysis of the received emergency alert message and/or other data, the qualifications and/or preferences required to qualify a participant in the supplemental rescue resources system to assist with the reported incident.

As noted, this may take the form of determining that a participant is qualified to perform certain activities, willing to assist in the type of incident reported, etc. If there are no qualified participants, in an embodiment, the supplemental rescue resources system resumes awaiting additional emergency alert messages.

Note that the activities of blocks 230 and 240 may be performed in any order or in conjunction. For example, in one embodiment it may be more efficient for a supplemental rescue resources system to determine the participants most proximate to an incident, and then determine which of the most proximate participants has the qualifications necessary to assist. Alternatively, a supplemental rescue resources system may first determine a subset of participants with the proper qualifications to assist with the incident, and then determine which of the subset are most proximate to the incident. In yet another alternative, these functions may be performed in conjunction, and a determination made of the participants that are both most proximate and qualified and/or willing to assist. Any permutation of these methods and functions are contemplated as within the scope of the present disclosure.

Once one or more supplemental rescue resources are determined, at block 250 the supplemental rescue resources system may transmit a message to the determined resources requesting assistance at the reported incident. As noted herein, such as request may include any information, such as a location of the incident, a request for particular information (e.g., report on injuries, picture of incident, etc.), a request for confirmation of receipt of the message, number and/or name of one or more affected parties, notice of emergency services providers notified, a request to await arrival of other participants (e.g., safer to address incident as a group or with a more highly trained participant), etc.

At block 260, the appropriate emergency services providers may be notified that one or more participants in the supplemental rescue resources system have been alerted. The notification may also indicate whether the participant is present at the incident or on the way to the incident. This notification may also include additional information that may be useful to an emergency services provider, such as the number of participants notified, the names and/or numbers of such participants, the qualifications and/or preferences of such participants, etc.

At block 270, a determination may be made as to whether additional information or data should be requested, or whether there are additional actions to take based on incoming updates or data. For example, a notification may be received from a participant that he or she has arrived at the incident. In response, the supplemental rescue resources system may send an update to an emergency services provider at block 260. This update may allow the emergency services provider to adjust its response. Alternatively, the supplemental rescue resources system may, in an embodiment in response to receiving a notification that a participant has arrived at the incident, send a request at block 250 for additional information to the participant, for example, requesting a picture of incident, a status, assessment, etc. In another alternative, the supplemental rescue resources system may, in an embodiment in response to receiving a notification that a participant has arrived at the incident, send an automatic control instruction to the mobile device of the participant at block 250 that directs the mobile device to automatically acquire additional information, for example, taking an image using a camera configured on the mobile device, determining a location of the mobile device, determining a rate and direction of movement of the mobile device, etc. At block 260, this additional information may be provided to an emergency services provider, allowing the emergency services provider to adjust its response.

Alternatively, upon notice that the participant has arrived at the incident, the supplemental rescue resources system may send helpful information, such as a CPR tutorial video, to the participant's mobile device. Note that any instructional, assistance, or informational media (e.g., video, audio, text, images, etc.) may be stored at, obtained by, and/or generated by a supplemental rescue resources system. Alternatively, a request for additional information or instruction to automatically control a mobile device may be transmitted to the mobile device that originated the emergency alert message received at block 210. In another embodiment, information may be received from an emergency services provider with an instruction to convey this information to the participant at the scene and/or to the mobile device that initiated the emergency alert message. For example, an emergency services provider may wish to inform those at the scene of an incident of the emergency services provider's estimated time of arrival, expected personnel, specific directions or locations to move to, etc. Any information may be requested from or sent to a participant, an emergency services provider, and/or one who initiated the received emergency alert and all such information is contemplated as within the scope of the present disclosure.

At block 270, a determination may also, or instead, be made as to whether a response is to be transmitted to the mobile device that initiated the emergency alert message received at block 210 or to any other device or system. If so, at block 280 a response may be transmitted. Such a response may include an acknowledgement that the emergency alert message was received, a notification that one or more supplemental rescue resources have been informed of the incident and/or are on the way to the location of the incident, information about the supplemental rescue resources such as names, telephone numbers, etc., instructions for actions that may be taken by the sender of the emergency alert message, directions to safety, estimated response time for supplemental rescue resources and/or emergency services personnel, and/or any other information or data that may be provided to a user who initiated an emergency alert message and/or to any other system or device.

In one embodiment, based on additional data received from a participant, a user who initiated the emergency alert message, or an emergency service provider, at block 250 additional supplemental rescue resources may be notified and their assistance requested. For example, a participant may arrive at the scene of an incident and determine that the incident is far more severe than initially thought, and request additional supplemental rescue resources. Alternatively, an emergency services provider may determine that it has fewer resources available than usual, and request additional supplemental rescue resources. Alternatively, a first participant may arrive at the incident scene and determine that it is much less severe than thought, which may trigger the supplemental rescue resources system to notify other supplemental rescue resources that may have initially been notified that their assistance is no longer needed. In another embodiment, a first participant may respond indicating that he or she is unable to go to the scene of the incident, and therefore the supplemental rescue resources system may request that another participant assist. In some embodiments, records of participation after being requested to do so may be maintained and used to determine when and if to call upon participants in the future. Any trigger or reason for adjusting the response of supplemental rescue resources may be used and any response to such inputs is contemplated as within the scope of the present disclosure.

In an embodiment, a participant in a supplemental rescue resources system may directly request assistance from other participants. For example, a first participant may know a second participant that has particular skills, or is simply known to the first participant, and may contact that participant directly using any means, including a phone call, email, text message social media website or portal, etc. Such contact may be logged or otherwise tracked by a supplemental rescue resources system for logging purposes. Alternatively, such contact may go through a supplemental rescue resources system, for example as additional data received at block 270, and the supplemental rescue resources system may then contact the second participant, in an embodiment after determining that the second participant is an authorized supplemental rescue resource. Alternatively, the second participant may not be a current member of a supplemental rescue resources system, but may be added on the fly as the first participant requests assistance from the second participant directly or through the supplemental rescue resources system. In an embodiment, a participant's mobile device may be configured with an application that detects or enables contact with other participants in a supplemental rescue resources system and/or nonparticipants and sends data to the supplemental rescue resources system so that such contact can be tracked and/or authorized. All such embodiments are contemplated as within the scope of the present disclosure.

In the embodiment where specialized assistance may be needed or desired, supplemental rescue resources that have related specialized knowledge but are not able to be physically present at an incident may be communicatively connected to a mobile device that is present in order to provide assistance. For example, it may be determined by a supplemental rescue resources system that a participant in the system that has knowledge of particular relevance to the incident, for example, based on the alert message received at block 210 and/or additional data received at block 270. In response, the supplemental rescue resources system may contact the supplemental rescue resource operating a mobile device at the incident and enable, instruct, or otherwise facilitate communications between that mobile device and a mobile device of the participant with specialized knowledge. Such communications may be direct, (e.g., the supplemental rescue resources system instructs the mobile device of the participant with specialized knowledge to call the mobile device of the participant at the incident, with to without user intervention) or indirect (e.g., the supplemental rescue resources system communicates with both the mobile device of the participant with specialized knowledge and the mobile device of the participant at the incident and bridges or otherwise facilitates the communications between the devices, with to without user intervention.) All such embodiments are contemplated as within the scope of the present disclosure.

In some embodiments, rewards, credits, money, and other incentives may be used to increase participation levels in a supplemental rescue resources system or reward those who provide assistance.

The supplemental rescue resources systems and methods described above assist in providing quicker emergency response and better resource allocation by involving more proximate resources sooner than is typically done in the current state of the art. By implementing the present disclosure, lives may be saved, injuries minimized, and dangerous incidents may be better and more efficiently addressed. Set forth below are further exemplary systems, devices, and components in which aspects of the disclosed supplemental rescue resources systems and methods may be implemented.

Figure 3:
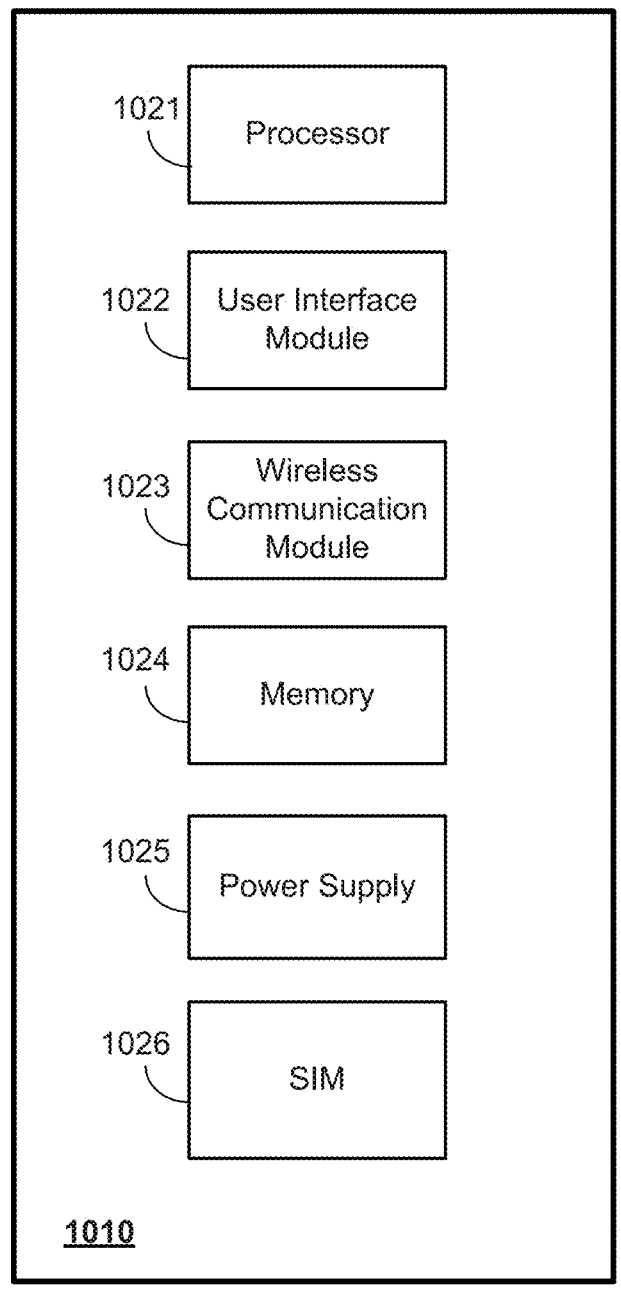
FIG. 3 is a block diagram of a non-limiting exemplary mobile device in which supplemental rescue resources methods and systems may be implemented.

FIG. 3 illustrates an example wireless device 1010 that may be used in connection with an embodiment. References will also be made to other figures of the present disclosure as appropriate. For example, mobile devices 150, 131, and 132 may be wireless devices of the type described in regard to FIG. 3, and may have some, all, or none of the components and modules described in regard to FIG. 3. It will be appreciated that the components and modules of wireless device 1010 illustrated in FIG. 3 are illustrative, and that any number and type of components and/or modules may be present in wireless device 1010. In addition, the functions performed by any or all of the components and modules illustrated in FIG. 3 may be performed by any number of physical components. Thus, it is possible that in some embodiments the functionality of more than one component and/or module illustrated in FIG. 3 may be performed by any number or types of hardware and/or software.

Processor 1021 may be any type of circuitry that performs operations on behalf of wireless device 1010. In one embodiment, processor 1021 executes software (i.e., computer-readable instructions stored on a tangible computer-readable medium) that may include functionality related to supplemental rescue resources systems and methods, for example. User interface module 1022 may be any type or combination of hardware and/or software that enables a user to operate and interact with wireless device 1010, and, in one embodiment, to interact with a system or software enabling the user to place, request, and/or receive calls, text communications of any type, emergency alert messages, voicemail, voicemail notifications, voicemail content and/or data, charging and/or billing data, and/or a system or software enabling the user to view, modify, or delete related software objects. For example, user interface module 1022 may include a display, physical and/or "soft" keys, voice recognition software, a microphone, a speaker and the like. Wireless communication module 1023 may be any type of transceiver including any combination of hardware and/or software that enables wireless device 1010 to communicate with wireless network equipment. Memory 1024 enables wireless device 1010 to store information, such as APNs, MNCs, MCCs, text communications content and associated data, multimedia content, software to efficiently process radio resource requests and service requests, and radio resource request processing preferences and configurations. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1010. SIM 1026 may be any type Subscriber Identity Module and may be configured on a removable or non-removable SIM card that allows wireless device 1010 to store data on SIM 1026.

Figure 4:
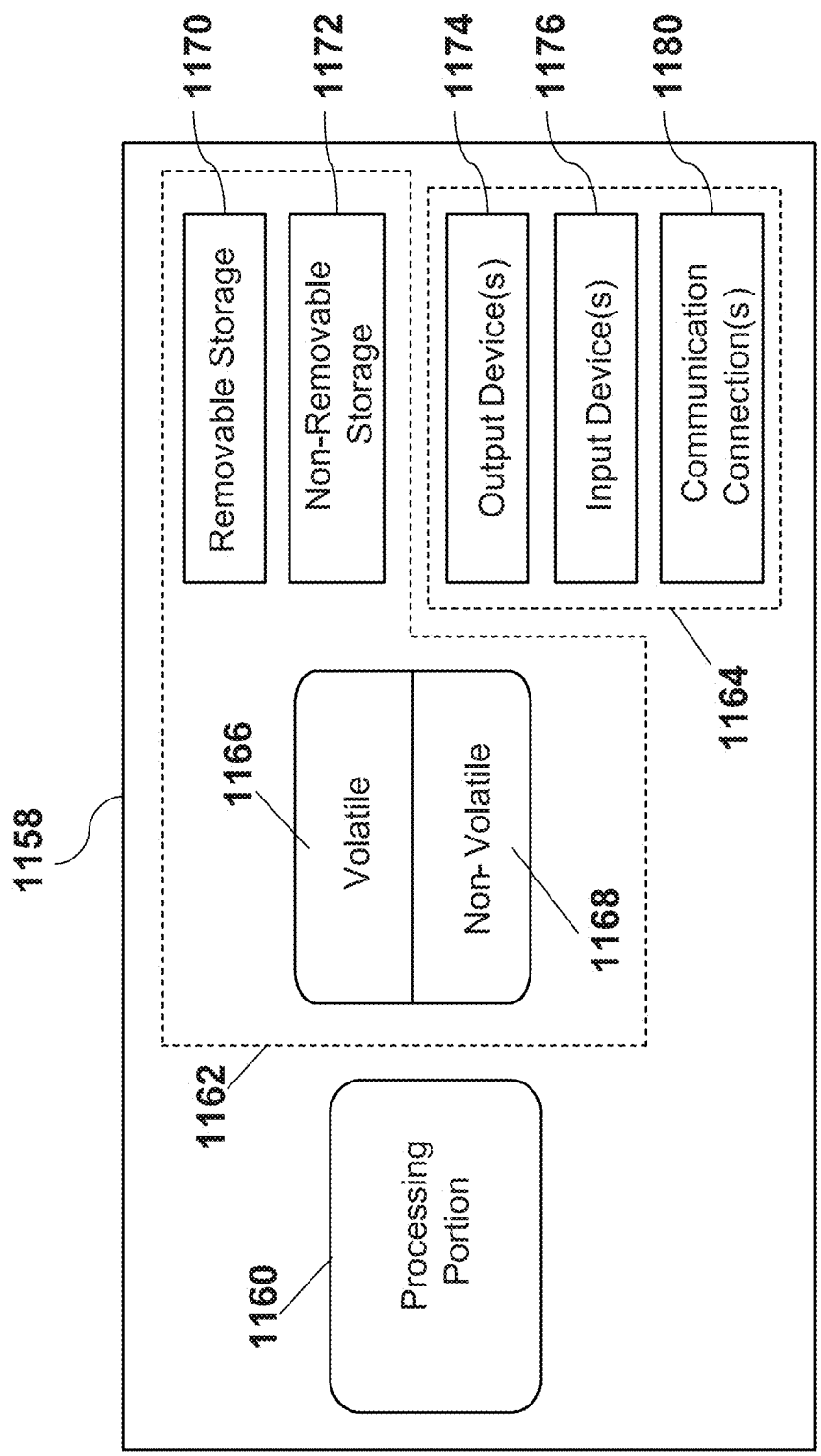
FIG. 4 is a block diagram of a non-limiting exemplary processor in which supplemental rescue resources methods and systems may be implemented.

FIG. 4 is a block diagram of an example processor 1158 which may be employed in any of the embodiments described herein, including as one or more components of mobile devices 150, 131, and 132, as one or more components of supplemental rescue resources system 110, and/or any related equipment, and/or as one or more components of any third party system or subsystem that may implement any portion of the subject matter described herein. It is emphasized that the block diagram depicted in FIG. 4 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof.

As depicted in FIG. 4, the processor 1158 comprises a processing portion 1160, a memory portion 1162, and an input/output portion 1164. The processing portion 1160, memory portion 1162, and input/output portion 1164 are coupled together (coupling not shown in FIG. 4) to allow communications between these portions. The input/output portion 1164 is capable of providing and/or receiving components, commands, and/or instructions, utilized to, for example, transmit and/or receive configuration data, transmit and receive device condition data, transmit and receive emergency alert messages and related data, messages, and requests for data, establish and terminate communications sessions, transmit and receive service requests and data access request data and responses, transmit, receive, store and process text, data, and voice communications, execute software that efficiently processes radio resource requests, receive and store service requests and radio resource requests, radio resource request processing preferences and configurations, and/or perform any function described herein.

The processor 1158 may be implemented as a client processor and/or a server processor. In a basic configuration, the processor 1158 may include at least one processing portion 1160 and memory portion 1162. The memory portion 1162 can store any information utilized in conjunction with establishing, transmitting, receiving, and/or processing text, data, and/or voice communications, communications-related data and/or content, voice calls, other telephonic communications, etc. For example, the memory portion is capable of storing condition and event data, emergency alert messages and related data, configuration commands, profiles, thresholds, APNs, MNCs, MCCs, service requests, radio resource requests, QoS and/or APN parameters, device and link status, condition, and congestion data, text and data communications, calls, voicemail, multimedia content, visual voicemail applications, etc. Depending upon the exact configuration and type of processor, the memory portion 1162 may be volatile (such as RAM) 1166, non-volatile (such as ROM, flash memory, etc.) 1168, or a combination thereof. The processor 1158 may have additional features/functionality. For example, the processor 1158 may include additional storage (removable storage 1170 and/or non-removable storage 1172) including, but not limited to, tangible computer-readable storage media such as magnetic disks, optical disks, tapes, flash memory, smart cards, and/or any combination thereof. Computer-readable storage media, such as memory and storage elements 1162, 1170, 1172, 1166, and 1168, may be tangible storage media that may be volatile or nonvolatile, removable or non-removable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other tangible medium that may be used to store the desired information and that can be accessed by the processor 1158. Any such computer storage media may be part of the processor 1158.

The processor 1158 may also contain the communications connection(s) 1180 that allow the processor 1158 to communicate with other devices, for example through a radio access network (RAN). Communications connection(s) 1180 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein may include both storage media and communication media. The processor 1158 also may have input device(s) 1176 such as keyboard, keypad, mouse, pen, voice input device, touch input device, etc. Output device(s) 1174 such as a display, speakers, printer, etc. may also be included.

A RAN as described herein may comprise any telephony radio network, or any other type of communications network, wireline or wireless, or any combination thereof. The following description sets forth some exemplary telephony radio networks, such as the global system for mobile communications (GSM), and non-limiting operating environments. The below-described operating environments should be considered non-exhaustive, however; and thus the below-described network architectures merely show how supplemental rescue resources systems and methods may be implemented with stationary and non-stationary network structures and architectures. It will be appreciated, however, that supplemental rescue resources systems and methods as described herein may be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

The exemplary GSM/GPRS environment and services described herein also may be extended to 3G services, such as Universal Mobile Telephone System (UMTS), Frequency Division Duplexing (FDD) and Time Division Duplexing (TDD), High Speed Packet Data Access (HSPDA), cdma2000 1x Evolution Data Optimized (EVDO), Code Division Multiple Access-2000 (cdma2000 3x), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), LTE-Advanced. etc., as well as to other network services that become available in time. In this regard, supplemental rescue resources systems and methods may be implemented independently of the method of data transport and does not depend on any particular network architecture or underlying protocols.

Figure 5:
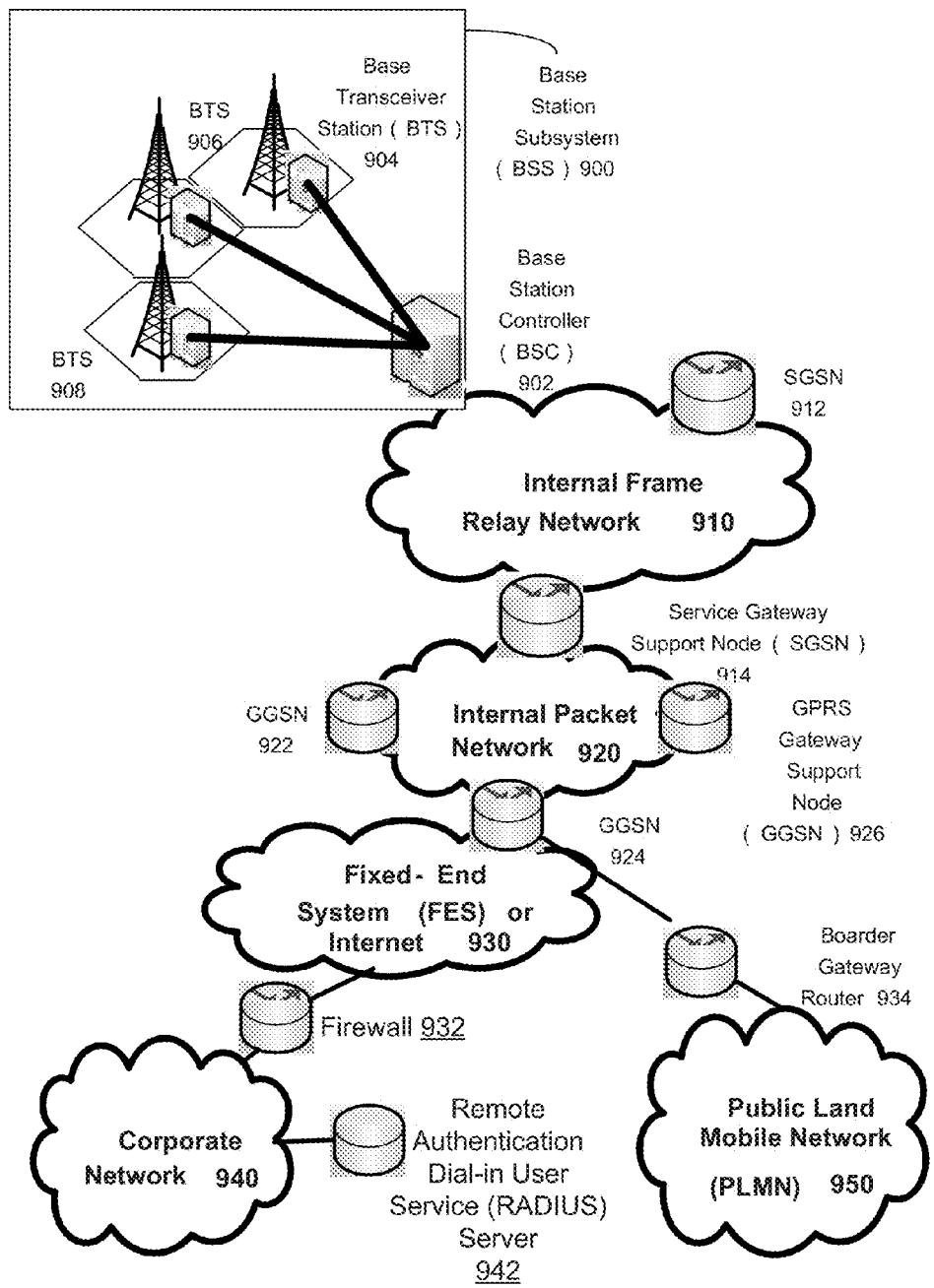
FIG. 5 is a block diagram of a non-limiting exemplary packet-based mobile cellular network environment, such as a GPRS network, in which supplemental rescue resources methods and systems may be implemented.

FIG. 5 depicts an overall block diagram of an exemplary packet-based mobile cellular network environment, such as a GPRS network, in which supplemental rescue resources systems and methods such as those described herein may be practiced. In an example configuration, any RAN component as described herein may be encompassed by or interact with the network environment depicted in FIG. 5. Similarly, mobile devices 150, 131, and 132 may communicate or interact with a network environment such as that depicted in FIG. 5. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., mobile devices 150, 131, and 132) become connected to the wireless network. In exemplary fashion, the packet traffic originating from user devices (e.g., mobile devices 150, 131, and 132) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc., may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932, and PLMN 950 may be connected to GGSN 924 via border gateway router 934. The Remote Authentication Dial-In User Service (RADIUS) server 942 may be used for caller authentication when a user of a mobile cellular device calls corporate network 940.

Generally, there may be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 6:
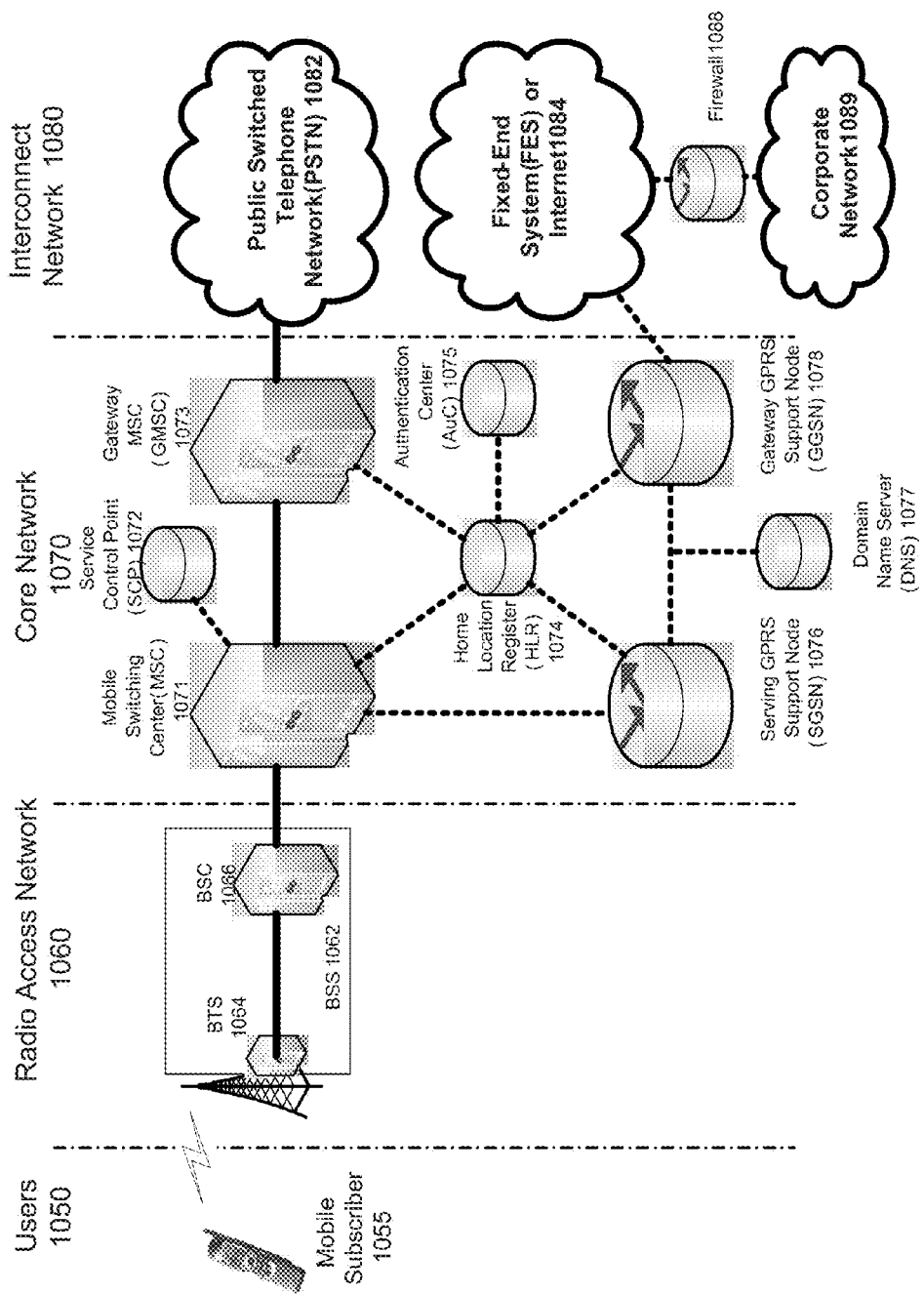
FIG. 6 illustrates a non-limiting exemplary architecture of a typical GPRS network, segmented into four groups, in which supplemental rescue resources methods and systems may be implemented.

FIG. 6 illustrates an architecture of a typical GPRS network segmented into four groups: users 1050, radio access network 1060, core network 1070, and interconnect network 1080. Users 1050 may comprise a plurality of end users (although only mobile subscriber 1055 is shown in FIG. 6). In an example embodiment, the device depicted as mobile subscriber 1055 may comprise any of mobile devices 150, 131, and 132. Radio access network 1060 comprises a plurality of base station subsystems such as BSSs 1062, which may include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 6, interconnect network 1080 comprises Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076 that may send the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. In some embodiments, HLR/HSS 240 may be a device such as HLR 1074. HLR 1074 may store static information about the subscribers such as the International Mobile Subscriber Identity (IMSI), APN profiles, subscribed services, and a key for authenticating the subscriber. HLR 1074 may also store dynamic subscriber information such as dynamic APN profiles and the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as mobile devices 150, 131, and 132, used by an end user of a mobile cellular service or a wireless provider. When a mobile subscriber turns on his or her mobile device, the mobile device may go through an attach process by which the mobile device attaches to an SGSN of the GPRS network. In FIG. 6, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself to the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076.

The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to an Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, that may be provisioned to map to one or more GGSN nodes in the core network 1070. Based on the APN, the mapped GGSN 1078 may access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality of supplemental rescue resources systems and methods such as those described herein may include, but are not limited to, any RAN component, Gateway GPRS Support Node tables, Fixed End System router tables, firewall systems, VPN tunnels, and any number of other network elements as required by the particular digital network.

Figure 7:
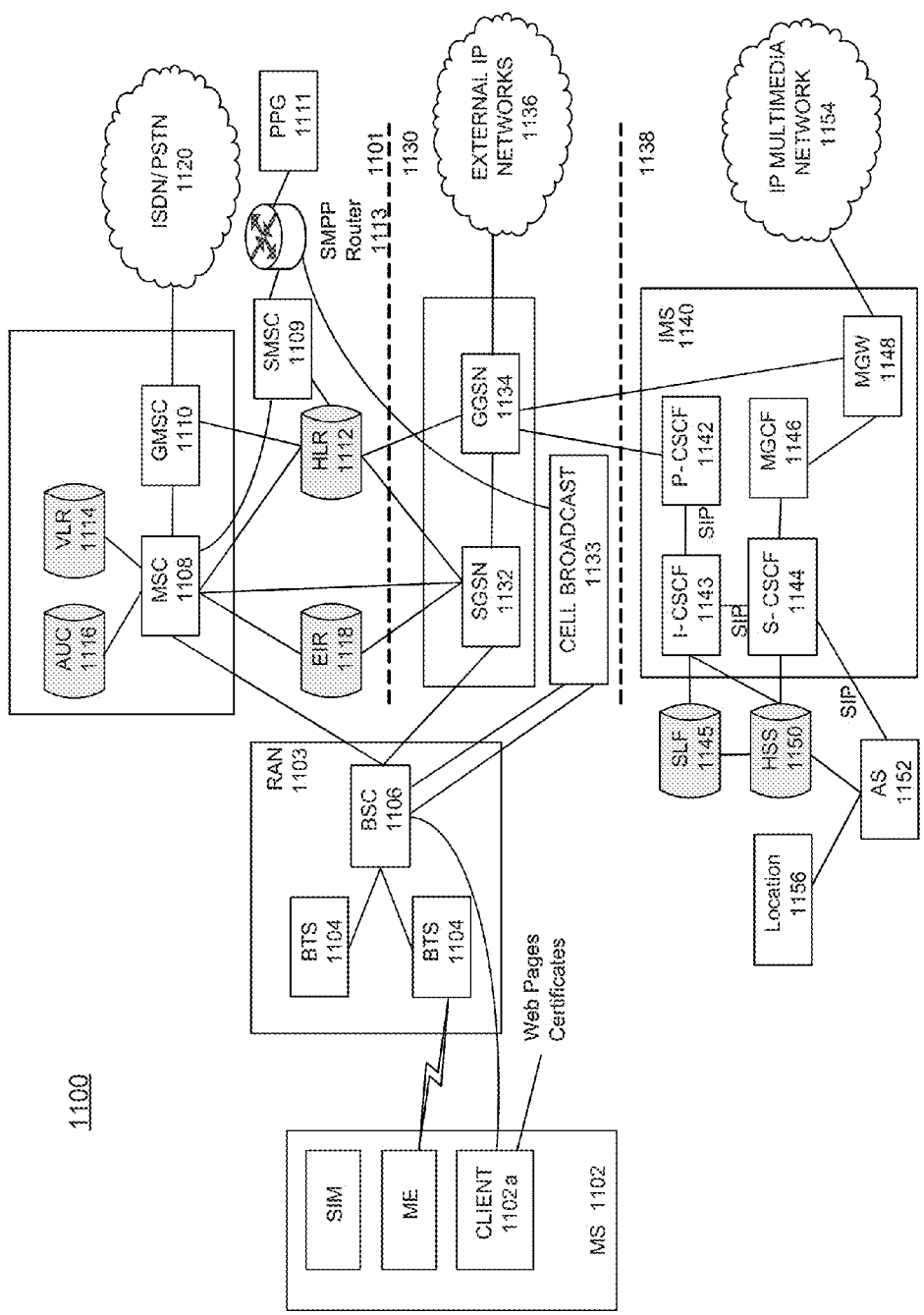
FIG. 7 illustrates a non-limiting alternate block diagram of an exemplary GSM/GPRS/IP multimedia network architecture in which supplemental rescue resources methods and systems may be implemented.

FIG. 7 illustrates another exemplary block diagram view of a GSM/GPRS/IP multimedia network architecture 1100 in which supplemental rescue resources systems and methods based on message type such as those described herein may be incorporated. As illustrated, architecture 1100 of FIG. 7 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 may be physical equipment or Mobile Equipment (ME), such as a mobile telephone or a laptop computer (e.g., mobile devices 150, 131, and 132) that may be used by mobile subscribers, in one embodiment with a Subscriber identity Module (SIM). The SIM may include an International Mobile Subscriber Identity (IMSI), which may be a unique identifier of a subscriber. The SIM may also include APNs. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 may be a database that may contain administrative information regarding each subscriber registered in a corresponding GSM network. Such information may include APNs and APN profiles. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The HLR 1112 and the VLR 1114, together with the MSC 1108, may provide the call routing and roaming capabilities of GSM. The AuC 1116 may provide the parameters needed for authentication and encryption functions. Such parameters allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, short message service (SMS), and multimedia message service (MMS), the MS may first register with the network to indicate its current location by performing a location update and IMSI attach procedure. MS 1102 may send a location update including its current location information to the MSC/VLR, via BTS 1104 and BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as an X.25 network or the Internet. In order to access GPRS services, the MS first attaches itself to the GPRS network by performing an attach procedure. The MS may then activate a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

GPRS network 1130 may be designed to operate in three network operation modes (NOM1, NOM2 and NOM3). A network operation mode of a GPRS network may be indicated by a parameter in system information messages transmitted within a cell. The system information messages may direct an MS where to listen for paging messages and how to signal towards the network. The network operation mode represents the capabilities of the GPRS network. In a NOM1 network, a MS may receive pages from a circuit switched domain (voice call) when engaged in a data call. The MS may suspend the data call or take both simultaneously, depending on the ability of the MS. In a NOM2 network, a MS may not receive pages from a circuit switched domain when engaged in a data call, since the MS may be receiving data and may not be listening to a paging channel. In a NOM3 network, a MS may monitor pages for a circuit switched network while receiving data and vice versa.

The IP multimedia network 1138 was introduced with 3GPP Release 5, and may include IP multimedia subsystem (IMS) 1140 to provide rich multimedia services to end users. A representative set of the network entities within IMS 1140 are a call/session control function (CSCF), a media gateway control function (MGCF) 1146, a media gateway (MGW) 1148, and a master subscriber database, called a home subscriber server (HSS) 1150. HSS 1150 may be common to GSM core network 1101, GPRS network 1130 as well as IP multimedia network 1138.

IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

I-CSCF 1143 forms an entrance to a home network and hides the inner topology of the home network from other networks and provides flexibility for selecting an S-CSCF. I-CSCF 1143 may contact subscriber location function (SLF) 1145 to determine which HSS 1150 to use for the particular subscriber, if multiple HSSs 1150 are present. S-CSCF 1144 may perform the session control services for MS 1102. This includes routing originating sessions to external networks and routing terminating sessions to visited networks. S-CSCF 1144 may also decide whether an application server (AS) 1152 is required to receive information on an incoming SIP session request to ensure appropriate service handling. This decision may be based on information received from HSS 1150 (or other sources, such as application server 1152). AS 1152 may also communicate to location server 1156 (e.g., a Gateway Mobile Location Center (GMLC)) that provides a position (e.g., latitude/longitude coordinates) of MS 1102.

HSS 1150 may contain a subscriber profile and keep track of which core network node is currently handling the subscriber. It may also support subscriber authentication and authorization functions (AAA). In networks with more than one HSS 1150, a subscriber location function provides information on the HSS 1150 that contains the profile of a given subscriber.

MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) MGW 1148 may also communicate with other IP multimedia networks 1154.

Push to Talk over Cellular (PoC) capable mobile telephones may register with the wireless network when the telephones are in a predefined area (e.g., job site, etc.) When the mobile telephones leave the area, they may register with the network in their new location as being outside the predefined area. This registration, however, does not indicate the actual physical location of the mobile telephones outside the pre-defined area.

Figure 8:
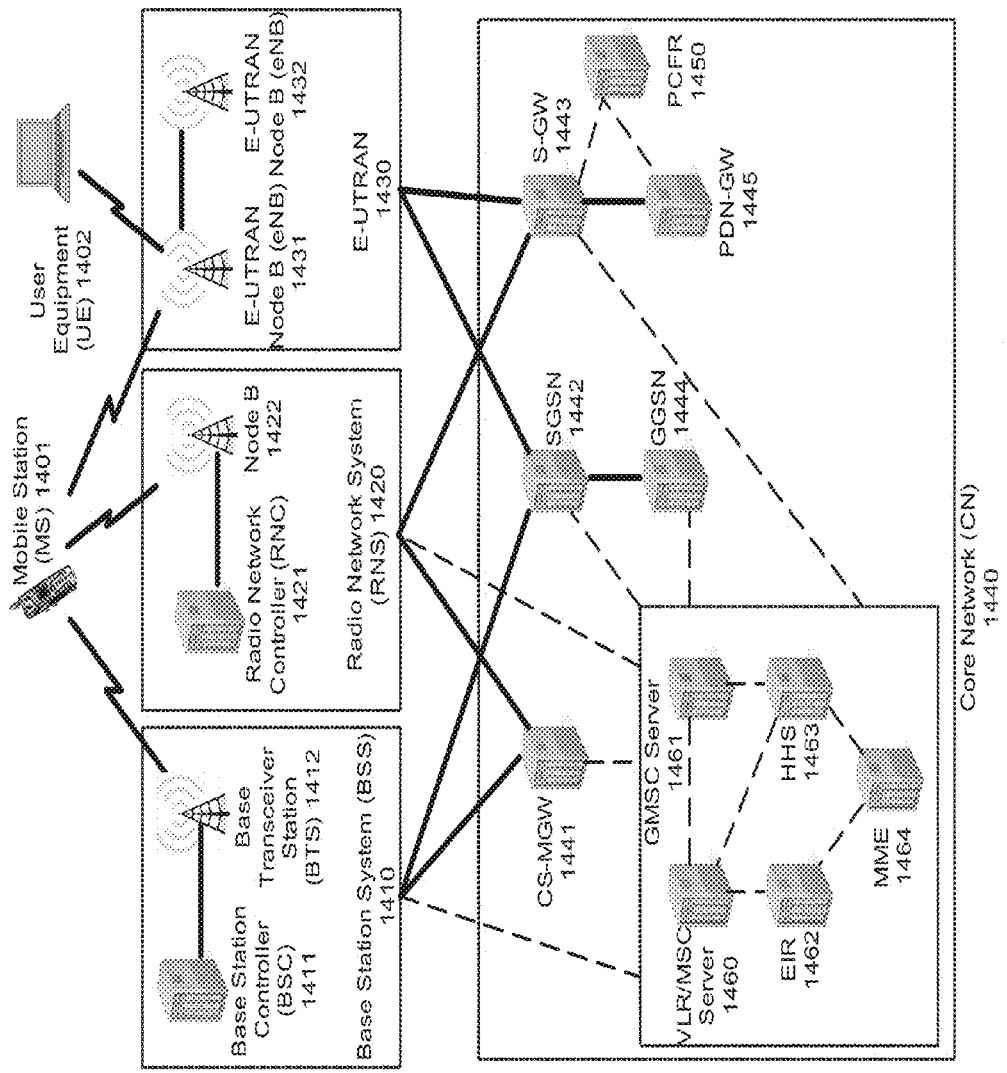
FIG. 8 illustrates a PLMN block diagram view of an example architecture in which supplemental rescue resources methods and systems may be incorporated.

FIG. 8 illustrates a PLMN block diagram view of an example architecture in which supplemental rescue resources systems and methods may be incorporated. Mobile Station (MS) 1401 is the physical equipment used by the PLMN subscriber. In one illustrative embodiment, any of mobile devices 150, 131, and 132 may serve as Mobile Station 1401. Mobile Station 1401 may be one of, but not limited to, a cellular telephone, a cellular telephone in combination with another electronic device, or any other wireless mobile communication device.

Mobile Station 1401 may communicate wirelessly with Base Station System (BSS) 1410. BSS 1410 contains a Base Station Controller (BSC) 1411 and a Base Transceiver Station (BTS) 1412. BSS 1410 may include a single BSC 1411/BTS 1412 pair (Base Station) or a system of BSC/BTS pairs which are part of a larger network. BSS 1410 is responsible for communicating with Mobile Station 1401 and may support one or more cells. BSS 1410 is responsible for handling cellular traffic and signaling between Mobile Station 1401 and Core Network 1440. Typically, BSS 1410 performs functions that include, but are not limited to, digital conversion of speech channels, allocation of channels to mobile devices, paging, and transmission/reception of cellular signals.

Additionally, Mobile Station 1401 may communicate wirelessly with Radio Network System (RNS) 1420. RNS 1420 contains a Radio Network Controller (RNC) 1421 and one or more Node(s) B 1422. RNS 1420 may support one or more cells. RNS 1420 may also include one or more RNC 1421/Node B 1422 pairs or alternatively a single RNC 1421 may manage multiple Nodes B 1422. RNS 1420 may be responsible for communicating with Mobile Station 1401 in its geographically defined area. RNC 1421 may be responsible for controlling the Node(s) B 1422 that are connected to it and is a control element in a UMTS radio access network. RNC 1421 may perform functions such as, but not limited to, load control, packet scheduling, handover control, security functions, as well as controlling Mobile Station 1401's access to the Core Network (CN) 1440.

The evolved UMTS Terrestrial Radio Access Network (E-UTRAN) 1430 is a radio access network that provides wireless data communications for Mobile Station 1401 and User Equipment 1402. E-UTRAN 1430 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 1430 may include of series of logical network components such as E-UTRAN Node B (eNode B, may also be referred to as an "eNB") 1431 and E-UTRAN Node B (eNB) 1432. E-UTRAN 1430 may contain one or more eNBs. User Equipment 1402 may be any user device capable of connecting to E-UTRAN 1430 including, but not limited to, a personal computer, laptop, mobile device, wireless router, or other device capable of wireless connectivity to E-UTRAN 1430. The improved performance of the E-UTRAN 1430 relative to a typical UMTS network allows for increased bandwidth, spectral efficiency, and functionality including, but not limited to, voice, high-speed applications, large data transfer and IPTV, while still allowing for full mobility.

An example embodiment of a mobile data and communication service that may be implemented in the PLMN architecture described in FIG. 8 is the Enhanced Data rates for GSM Evolution (EDGE). EDGE is an enhancement for GPRS networks that implements an improved signal modulation scheme known as 8-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 1401 may communicate with any or all of BSS 1410, RNS 1420, or E-UTRAN 1430. In an illustrative system, each of BSS 1410, RNS 1420, and E-UTRAN 1430 may provide Mobile Station 1401 with access to Core Network 1440. The Core Network 1440 may include of a series of devices that route data and communications between end users. Core Network 1440 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched-Media Gateway Function (CS-MGW) 1441 is part of Core Network 1440, and interacts with Visitor Location Register (VLR) and Mobile-Services Switching Center (MSC) Server 1460 and Gateway MSC Server 1461 in order to facilitate Core Network 1440 resource control in the CS domain. Functions of CS-MGW 1441 may include, but are not limited to, media conversion, bearer control, payload processing and other mobile network processing such as handover or anchoring. CS-MGW 1441 may receive connections to Mobile Station 1401 through BSS 1410, RNS 1420 or both.

Serving GPRS Support Node (SGSN) 1442 stores subscriber data regarding Mobile Station 1401 in order to facilitate network functionality. SGSN 1442 may store subscription information such as, but not limited to, the International Mobile Subscriber Identity (IMSI), temporary identities, or Packet Data Protocol (PDP) addresses. SGSN 1442 may also store location information such as, but not limited to, the Gateway GPRS Support Node (GGSN) 1444 address for each GGSN where an active PDP exists. GGSN 1444 may implement a location register function to store subscriber data it receives from SGSN 1442 such as subscription or location information.

Serving Gateway (S-GW) 1443 is an interface which provides connectivity between E-UTRAN 1430 and Core Network 1440. Functions of S-GW 1443 may include, but are not limited to, packet routing, packet forwarding, transport level packet processing, event reporting to Policy and Charging Rules Function (PCRF) 1450, and mobility anchoring for inter-network mobility. PCRF 1450 uses information gathered from S-GW 1443, as well as other sources, to make applicable policy and charging decisions related to data flows, network resources and other network administration functions. Packet Data Network Gateway (PDN-GW) 1445 may provide user-to-services connectivity functionality including, but not limited to, network-wide mobility anchoring, bearer session anchoring and control, and IP address allocation for PS domain connections.

Home Subscriber Server (HSS) 1463 is a database for user information and may store subscription data regarding Mobile Station 1401 or User Equipment 1402 for handling calls or data sessions. Networks may contain one HSS 1463 or more if additional resources are required. Example data stored by HSS 1463 may include, but is not limited to, user identification, numbering and addressing information, security information, or location information. HSS 1463 may also provide call or session establishment procedures in both the PS and CS domains.

The VLR/MSC Server 1460 provides user location functionality. When Mobile Station 1401 enters a new network location, it begins a registration procedure. A MSC Server for that location transfers the location information to the VLR for the area. A VLR and MSC Server may be located in the same computing environment, as is shown by VLR/MSC Server 1460, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 1401 registration or procedures for handover of Mobile Station 1401 to a different section of the Core Network 1440. GMSC Server 1461 may serve as a connection to alternate GMSC Servers for other mobile stations in larger networks.

Equipment Identity Register (EIR) 1462 is a logical element which may store the International Mobile Equipment Identities (IMEI) for Mobile Station 1401. In a typical embodiment, user equipment may be classified as either "white listed" or "black listed" depending on its status in the network. In one embodiment, if Mobile Station 1401 is stolen and put to use by an unauthorized user, it may be registered as "black listed" in EIR 1462, preventing its use on the network. Mobility Management Entity (MME) 1464 is a control node which may track Mobile Station 1401 or User Equipment 1402 if the devices are idle. Additional functionality may include the ability of MME 1464 to contact an idle Mobile Station 1401 or User Equipment 1402 if retransmission of a previous session is required.

While example embodiments of supplemental rescue resources systems and methods have been described in connection with various computing devices/processors, the underlying concepts may be applied to any computing device, processor, or system capable of implementing supplemental rescue resources systems and methods. The various techniques described herein may be implemented in connection with hardware or software or, where appropriate, with a combination of both. Thus, the supplemental rescue resources systems and methods may be implemented, or certain aspects or portions thereof, may take the form of program code (i.e., instructions) embodied in tangible storage media having a tangible physical structure. Examples of tangible storage media include floppy diskettes, CD-ROMs, DVDs, hard drives, or any other tangible machine-readable storage medium (computer-readable storage medium). Thus, a computer-readable storage medium is neither a transient nor a propagating signal per se. When the program code is loaded into and executed by a machine, such as a computer, the machine becomes an apparatus for implementing supplemental rescue resources systems and methods. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

While supplemental rescue resources systems and methods have been described in connection with the various embodiments of the various figures, it is to be understood that other similar embodiments may be used or modifications and additions may be made to the described embodiments for performing the same functions of supplemental rescue resources systems and methods without deviating therefrom. For example, one skilled in the art will recognize that supplemental rescue resources systems and methods as described in the present application may apply to any environment, whether wired or wireless, and may be applied to any number of such devices connected via a communications network and interacting across the network. Therefore, supplemental rescue resources systems and methods should not be limited to any single embodiment, but rather should be construed in breadth and scope in accordance with the appended claims.

What is claimed is:

1. A method comprising:
   receiving, at a supplemental rescue resources system, an emergency alert communication comprising an indication of a location from a first mobile device;
   determining, at the supplemental rescue resources system, a plurality of supplemental rescue resources based on the emergency alert communication, wherein the plurality of supplemental rescue resources are not associated with an emergency services provider proximate to the location;
determining a plurality of locations of a respective plurality of devices associated with each supplemental rescue resource of the plurality of supplemental rescue resources;
determining respective qualifications of each supplemental rescue resource of the plurality of supplemental rescue resources;
selecting, based on the plurality of locations and the respective qualification, at the supplemental rescue resources system from among the plurality of supplemental rescue resources, a supplemental rescue resource associated with a second mobile device that is proximate to the location and comprises qualifications appropriate for the emergency; and
transmitting, from the supplemental rescue resources system to the second mobile device, a request to provide assistance.

2. The method of claim 1, wherein determining the plurality of supplemental rescue resources is further based on preferences of each of the plurality of supplemental rescue resources determined by the supplemental rescue resources system.

3. The method of claim 1, further comprising transmitting a request for additional data to the supplemental rescue resource.

4. The method of claim 1, further comprising transmitting, to the emergency services provider proximate to the location, a notification indicating that the supplemental rescue resource has been notified.

5. The method of claim 1, further comprising transmitting, to the first mobile device, a notification indicating that the supplemental rescue resource has been notified.

6. The method of claim 1, further comprising:
receiving additional data from the supplemental rescue resource; and
transmitting the additional data to the emergency services provider proximate to the location.

7. The method of claim 1, the emergency alert communication comprising an indication of a health condition of a user of the first mobile device.

8. A supplemental rescue resources system comprising:
a memory comprising executable instructions; and
a processor, wherein the processor, when executing the executable instructions, effectuates operations comprising:
receiving an emergency alert communication comprising an indication of a location from a first mobile device;
determining a plurality of supplemental rescue resources based on the emergency alert communication, wherein the plurality of supplemental rescue resources are not associated with an emergency services provider proximate to the location;
determining a plurality of locations of a respective plurality of devices associated with each supplemental rescue resource of the plurality of supplemental rescue resources;
determining respective qualifications of each supplemental rescue resource of the plurality of supplemental rescue resources;
selecting, based on the plurality of locations and the respective qualification, from among the plurality of supplemental rescue resources, a supplemental rescue resource associated with a second mobile device that is proximate to the location and comprises qualifications appropriate for the emergency; and
transmitting, to the second mobile device, a request to provide assistance.

9. The supplemental rescue resources system of claim 8, wherein the operation of determining the plurality of supplemental rescue resources is further based on preferences of each of the plurality of supplemental rescue resources obtained by the supplemental rescue resources system.

10. The supplemental rescue resources system of claim 8, wherein the operations further comprise transmitting a request for additional data to the supplemental rescue resource.

11. The supplemental rescue resources system of claim 8, wherein the operations further comprise transmitting, to the emergency services provider proximate to the location, a notification indicating that the supplemental rescue resource has been notified.

12. The supplemental rescue resources system of claim 8, wherein the operations further comprise transmitting, to the first mobile device, a notification indicating that the supplemental rescue resource has been notified.

13. The supplemental rescue resources system of claim 8, wherein the operations further comprise:
receiving additional data from the supplemental rescue resource; and
transmitting the additional data to the emergency services provider proximate to the location.

14. The supplemental rescue resources system of claim 8, the emergency alert communication comprising an indication of a health condition of a user of the first mobile device.

15. A tangible computer-readable storage medium comprising computer-executable instructions, which when executed by a processor, cause the processor to effectuate operations comprising:
receiving an emergency alert communication comprising an indication of a location from a first mobile device;
determining a plurality of supplemental rescue resources based on the emergency alert communication, wherein the plurality of supplemental rescue resources are not associated with an emergency services provider proximate to the location;
determining a plurality of locations of a respective plurality of devices associated with each supplemental rescue resource of the plurality of supplemental rescue resources;
determining respective qualifications of each supplemental rescue resource of the plurality of supplemental rescue resources;
selecting, based on the plurality of locations and the respective qualification, at the supplemental rescue resources system from among the plurality of supplemental rescue resources, a supplemental rescue resource associated with a second mobile device that is proximate to the location and comprises qualifications appropriate for the emergency; and
transmitting, to the second mobile device, a request to provide assistance.

16. The tangible computer-readable storage medium of claim 15, wherein the operation of determining the plurality of supplemental rescue resources is further based on preferences of each of the plurality of supplemental rescue resources.

17. The tangible computer-readable storage medium of claim 15, wherein the operations further comprise transmitting a request for additional data to the supplemental rescue resource.

18. The tangible computer-readable storage medium of claim 15, wherein the operations further comprise transmitting, to an emergency services provider, a notification indicating that the supplemental rescue resource has been notified.

19. The tangible computer-readable storage medium of claim 15, wherein the operations further comprise transmitting, to the first mobile device, a notification indicating that the supplemental rescue resource has been notified.

20. The tangible computer-readable storage medium of claim 15, the emergency alert communication comprising an indication of a health condition of a user of the first mobile device.

\* \* \* \* \*